Dec. 23, 1930.  A. PRESSER  1,785,913
STEERING AIRCRAFT
Filed July 6, 1928
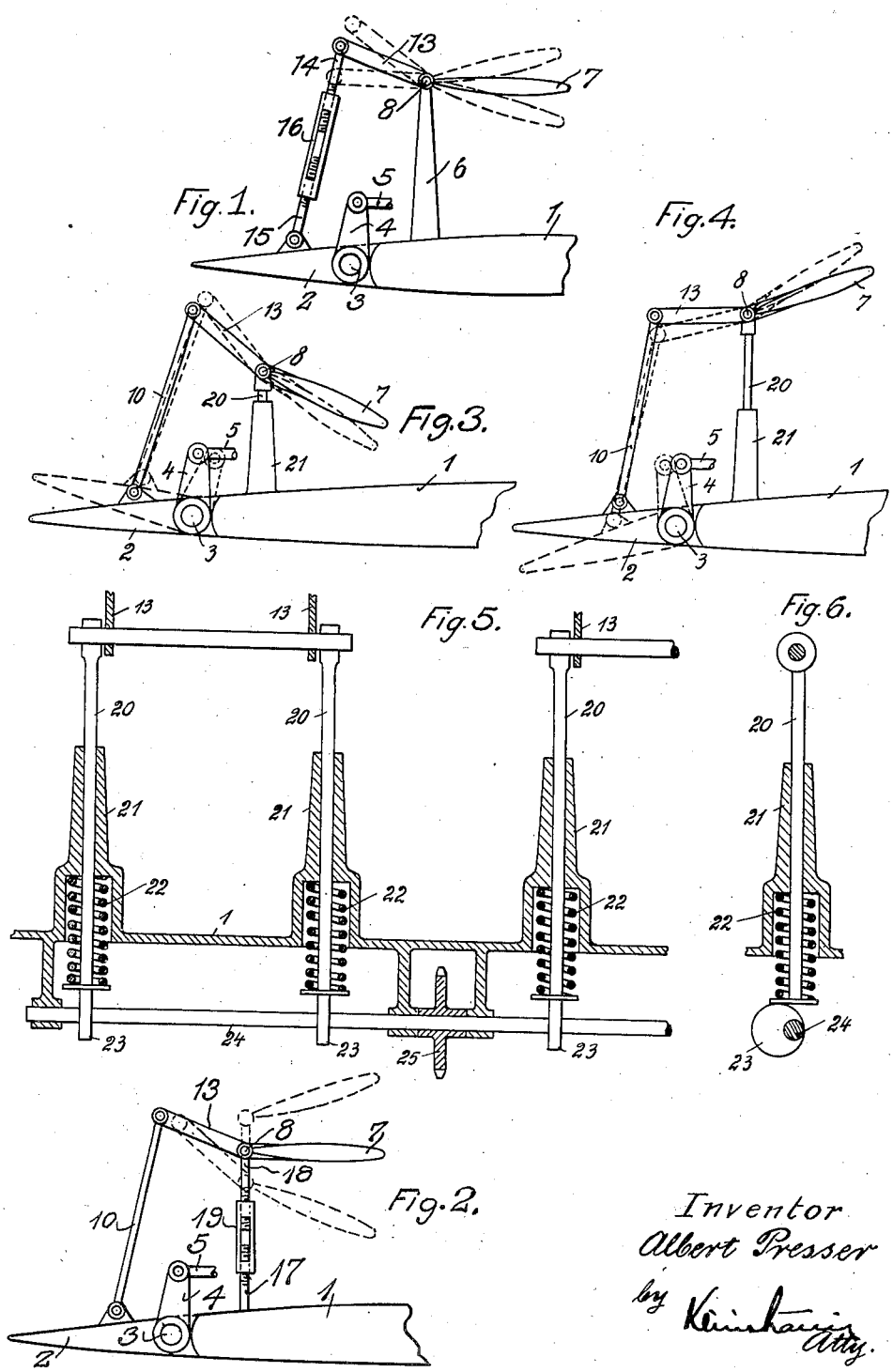

Patented Dec. 23, 1930

1,785,913

UNITED STATES PATENT OFFICE

ALBERT PRESSER, OF FRIEDRICHSHAFEN-ON-THE-BODENSEE, GERMANY, ASSIGNOR TO THE FIRM DORNIER-METALLBAUTEN, G. M. B. H., OF FRIEDRICHSHAFEN-ON-THE-BODENSEE, GERMANY

STEERING AIRCRAFT

Application filed July 6, 1928, Serial No. 200,778, and in Germany February 15, 1928.

My invention refers to the steering of aircraft and more especially to means whereby the rudders of aircraft, for instance flying machines, can be adjusted either before or during flight in such manner as to compensate for the action of forces tending to deflect the rudder from its correct position.

As is well known to those skilled in the art, if an aircraft is flying straight forward, the steering surfaces such as the rudders take up a stable position of equilibrium in which they extend in a direction opposite to the direction of flight. This is the case however only provided that no forces are acting on the rudder or on the aircraft tending to constantly deflect the craft from the direction of flight in one and the same sense. If such forces act on the craft, the pilot can force the craft to fly straight forward only by permanently counteracting this force by correspondingly deflecting the rudder to one side. In consequence of this necessity of constantly actuating the rudder the pilot is unnecessarily fatigued, more especially in long distance flights.

According to the present invention I effect the correction of the position of the rudder by means of an auxiliary surface of the well known kind which is used for relieving the steering surface of the torque exerted upon it by the air pressure. This auxiliary surface is connected with the rudder, for instance by suitable links, and means are provided, whereby the angle enclosed between the steering surface and the auxiliary or compensating surface can be varied either before the starting or during the flight.

In the drawings affixed to this specification and forming part thereof the principal parts of an aircraft embodying my invention are illustrated diagrammatically by way of example.

In the drawings

Fig. 1 is a cross section of a wing, rudder and auxiliary surface,

Fig. 2 is a similar illustration of a second modification,

Figs. 3 and 4 are similar views,

Fig. 5 is an axial section, and

Fig. 6 is a cross section of the fourth modification, Figs. 5 and 6 being drawn to a larger scale.

Referring first to Fig. 1, 1 is a wing or bearing plane of a flying machine and 2 is a rudder for altitude steering hinged to the rear edge of wing 1 at 3, 4 is a lever arm and 5 is the connecting rod leading to the pilot's seat for actuating the rudder. 6 is one of a plurality of standards mounted on the wing and 7 is the auxiliary or compensating surface hinged to the top ends of the standards 6 at 8, 13 is a lever pivoted to the standard 6 in the hinge point 8, the end of the lever being linked to the rudder 2 by means of a link 10 formed by two threaded bolts 14, 15, one linked to lever 13, the other to the rudder 2, a turnbuckle 16 gripping the ends of the two links 14, 15. By operating the turnbuckle 16 the distance between the end of lever 13 and the rudder 2 can be varied, thereby varying also the angle enclosed between the surface 7 and the rudder.

Normally the parts will assume the position shown in full lines, where the auxiliary surface 7 includes an angle with the rudder 2 which is substantially equal to zero. In consequence thereof the auxiliary surface 7 will not act on the rudder so as to exert thereon any deflecting force during flight. However if the position of the auxiliary surface 7 is changed relative to the rudder 2, as shown in dotted lines, the travelling wind will exert a turning moment on the auxiliary surface, whereby this latter surface and along with it also the rudder will be deflected. The steering surface or rudder is now influenced by the travelling wind which creates a turning moment opposed to that exerted on the auxiliary surface. The two surfaces will now move until the two turning moments have compensated each other, in other words, until the system of surfaces has found a new position of equilibrium. If the angular adjustment of the auxiliary surface relative to the steering surface is correctly chosen, this new position of equilibrium will be the position, in which the rudder, while the craft is flying straight forward, compensates the forces which tend to change the direction of flight.

Fig. 2 illustrates a modification, in which the auxiliary surface 7 is fixed to lever 13 as in Fig. 4, however the lever is linked to the rudder 2 by means of an ordinary link 10. On the other hand the standard 6 is here replaced by a threaded bolt 17 fixed on the wing 1 and a second threaded bolt 18 carrying the lever 13 and auxiliary surface 7. 19 is a turnbuckle connecting the two bolts and allowing bolt 18 to be raised and lowered relative to the wing, thereby varying the position of the hinge point 8 of the auxiliary surface 7 relative to the rudder 2. Such variation of the position of the hinge point is accompanied by a change in the angular position of the auxiliary surface 7 and lever 13 relative to the rudder 2.

In the modification illustrated in Figs. 3-6 the shifting of the hinge point 8 relative to the wing can be effected during flight and simultaneously for a plurality of juxtaposed surfaces. Here the auxiliary surface 7 is hinged together with the lever 13 at 8 to the top end of a spindle 20 mounted for free vertical reciprocation in a hollow standard 21 secured to the wing 1. A coil spring 22 surrounding the bottom end of rod 20 tends to pull it down as shown in Fig. 3. This action of the spring is counteracted by an eccentric disc 23 mounted on a horizontal spindle 24 extending across the wing and carrying a number of eccentric discs 23 equal to the number of rods 20 which shall be raised against the action of springs 22. 25 is a sprocket wheel keyed on the spindle 24 and serving for rotating this spindle by means of a chain drive operated by the pilot. Obviously this latter by imparting angular movement to spindle 24 is enabled to raise or lower all the rods 20 and in consequence thereof to adjust the angular position of the auxiliary surface 7 relative to the rudder 2, with which they are connected by the levers 13 and links 10.

I wish it to be understood that I do not desire to be limited to the exact details of construction shown and described for obvious modifications will occur to a person skilled in the art.

I claim:—

1. Flying machine comprising a wing, a rudder pivotally connected with said wing, a movable auxiliary surface, means connecting said surface with said wing, and with said rudder, respectively, and means for varying the length of one of said connecting means.

2. Flying machine comprising a wing, a rudder pivotally connected with said wing, a movable auxiliary surface, means connecting said surface with said wing and with said rudder, respectively, and means for varying during flight the length of one of said connecting means.

3. Flying machine comprising a wing, a rudder pivotally connected with said wing, a movable auxiliary surface, means supporting said surface on said wing, means connecting said surface with said rudder, and means for varying the effective length of said supporting means.

4. Flying machine comprising a wing, a rudder pivotally connected with said wing, a movable auxiliary surface, means supporting said surface on said wing, means connecting said surface with said rudder and means for varying during flight the effective length of said supporting means.

5. Flying machine comprising a wing, a rudder pivotally connected with said wing, a movable auxiliary surface, means hingedly connecting said surface to said wing and to said rudder respectively, and means for shifting one of the hinge points relative to said wing.

6. Flying machine comprising a wing, a rudder pivotally connected with said wing, a movable auxiliary surface, means for hingedly supporting said surface on said wing, means for hingedly connecting said surface with said rudder and means for shifting the hinge point of said supporting means relative to said wing.

7. Flying machine comprising a wing, a rudder pivotally connected to said wing, a support mounted on said wing for longitudinal displacement relative thereto, an auxiliary surface hinged to said support, a link connecting said surface with said rudder and means for displacing during flight said support relative to said wing.

8. Flying machine comprising a wing, a rudder pivotally connected to said wing, a support mounted on said wing, for longitudinal displacement relative thereto, an auxiliary surface hinged to said support, a link connecting said surface with said rudder and means comprising a cam shaft for displacing during flight said support relative to said wing.

In testimony whereof I affix my signature.

ALBERT PRESSER.